US005344695A

United States Patent [19]

Hirai et al.

[11] Patent Number: 5,344,695

[45] Date of Patent: Sep. 6, 1994

[54] DIELECTRIC FILTER HAVING COUPLING ELECTRODES FOR CONNECTING RESONATOR ELECTRODES, AND METHOD OF ADJUSTING FREQUENCY CHARACTERISTIC OF THE FILTER

[75] Inventors: Takami Hirai, Aichi; Shinsuke Yano, Nagoya, both of Japan

[73] Assignee: NGK Insulators, Ltd., Japan

[21] Appl. No.: 858,622

[22] Filed: Mar. 27, 1992

[30] Foreign Application Priority Data

Mar. 29, 1991 [JP] Japan .................................... 3-93092

[51] Int. Cl.$^5$ .................................................. B32B 9/00

[52] U.S. Cl. .................................... 428/209; 428/192; 428/901; 333/205; 333/206

[58] Field of Search ................ 333/205, 206; 428/901, 428/209, 192

[56] References Cited

U.S. PATENT DOCUMENTS

| | | | |
|---|---|---|---|
| 3,451,015 | 6/1969 | Heath . | |
| 3,512,110 | 5/1970 | Clar | 333/10 |
| 4,157,515 | 6/1979 | de Bayser et al. | 333/17 R |
| 4,418,324 | 11/1983 | Higgins | 333/204 |
| 4,673,902 | 6/1987 | Takeda et al. | 333/202 |
| 4,716,391 | 12/1987 | Moutrie et al. | 333/206 |
| 4,963,843 | 10/1990 | Peckham | 333/203 |
| 4,975,664 | 12/1990 | Ito et al. | 333/205 |

FOREIGN PATENT DOCUMENTS

| | | |
|---|---|---|
| 0346672A3 | 12/1989 | European Pat. Off. . |
| 0346672A2 | 12/1989 | European Pat. Off. . |
| 0414619A2 | 2/1991 | European Pat. Off. . |
| 54-71940 | 10/1952 | Japan . |
| 59-51606 | 3/1984 | Japan . |
| 62-164301 | 7/1987 | Japan . |
| 63-119302 | 5/1988 | Japan . |
| 4-32803 | 8/1992 | Japan . |

*Primary Examiner*—Patrick J. Ryan
*Assistant Examiner*—Cathy Lee
*Attorney, Agent, or Firm*—Parkhurst, Wendel & Rossi

[57] ABSTRACT

A tri-plate type dielectric filter having a dielectric substrate, a plurality of resonator electrodes embedded in the substrate, and coupling electrodes formed within the dielectric substrate for capacitively connecting the resonator electrodes to provide capacitors between adjacent resonator electrodes. The resonator electrodes may take the form of parallel elongate strips each providing a stripline type $\lambda/4$ or $\lambda/2$ TEM mode resonance circuit. One end of each strip is exposed at an outer surface of the substrate. This end of each strip is trimmed to adjust the resonance frequency of the resonance circuit.

13 Claims, 7 Drawing Sheets

DIELECTRIC FILTER HAVING COUPLING ELECTRODES FOR CONNECTING RESONATOR ELECTRODES, AND METHOD OF ADJUSTING FREQUENCY CHARACTERISTIC OF THE FILTER

BACKGROUND OF THE INVENTION

1. Field of the Invention

The present invention relates in general to a dielectric filter for the microwave spectrum of frequency and a method of adjusting the frequency characteristic of the dielectric filter. More particularly, the present invention is concerned with a small-sized dielectric filter constructed for excellent filtering properties, and a method by which the frequency characteristic of such dielectric filter can be easily adjusted.

2. Discussion of the Prior Art

In a microwave telecommunication system of modern vintage such as a portable or automobile telephone system, various filters using dielectric ceramics are used for minimizing the transmission loss. A known dielectric filter has a plurality of coaxial type resonators connected to each other. Each resonator is a dielectric block which has a central through-hole whose cylindrical surface is metallized to provide a central conductor serving as a resonating element. However, the central through-holes of the resonators have been a limiting factor to an effort to reduce the thickness and size of this type of dielectric filter. Further, this dielectric filter has a relatively large number of parts, and accordingly requires a cumbersome or complex fabrication process.

On the other hand, a three-layered or so-called tri-plate type dielectric filter as disclosed in laid-open Publication No. 59-51606 of unexamined Japanese Patent Application, for example, is free from such drawbacks. Namely, it is recognized in the art that the tri-plate type dielectric filter can be comparatively easily fabricated, with a considerably reduced thickness. An example of the dielectric filter of the tri-plate construction is illustrated in FIGS. 12 and 13. This dielectric filter, which is indicated generally at 2 in FIG. 12, has a dielectric substrate 6 in which there is embedded a patterned array of an input and an output electrode 3 and a plurality of stripline resonator electrodes 4 (three electrodes 4 in this specific example). The outer surfaces of the dielectric substrate 6 are coated with a ground conductor 8 (respective conductive films 8), except certain areas on a pair of opposed side surfaces, on which an input and an output contact 10 are formed, respectively. Thus, the dielectric filter 2 is fabricated to be considerably compact and thin.

In the known tri-plate type dielectric filter 2 shown in FIG. 13, the resonator electrodes 4 are formed so as to provide a comb-shaped or interdigital structure, and the desired filtering properties are obtained by adjusting the spacing between the adjacent resonator electrodes 4. That is, the dielectric filter 2 does not have a circuit for electrically connecting the resonator electrodes 4. However, the applicants recognized a need for providing such an electrically connecting circuit so as to provide capacitors between the adjacent electrodes 4, in order to meet recent stringent requirements for improved properties of the dielectric filter for the microwave frequencies, which cannot be dealt with by the mere provision of a simple comb-shaped or interdigital structure of the resonator electrodes.

Conventionally, the final fine adjustment to obtain the desired frequency characteristic of the dielectric filter 2 is accomplished by trimming a portion of the ground conductor 8 which corresponds to the resonator electrodes 4, or by trimming the short-circuited ends of the electrodes 4 that are electrically connected to the conductor 8. However, the positions of the electrodes 4 embedded in the dielectric substrate 6 cannot be accurately detected, and it is difficult to achieve the desired frequency characteristic of the filter by trimming.

SUMMARY OF THE INVENTION

The present invention was developed to solve the problem encountered in the prior art as described above. It is therefore a first object of this invention to provide a tri-plate type dielectric filter which exhibits improved filtering properties, without an increase in the size and the number of parts.

A second object of the invention is to provide a method suitable for facilitating adjustment of the frequency characteristic of such dielectric filter.

The first object may be achieved according to one aspect of the present invention, which provides a tri-plate type dielectric filter having a dielectric substrate and a plurality of resonator electrodes embedded in the substrate, 10 the dielectric filter being characterized by coupling electrodes which are formed within the dielectric substrate, for electrically connecting the plurality of resonator electrodes, so as to provide capacitors each of which is provided between adjacent ones of the resonator electrodes.

In the tri-plate type dielectric filter of the present invention constructed as described above, the capacitance of each capacitor provided by the coupling electrodes between the adjacent resonator electrodes can be adjusted by the coupling electrodes, whereby the desired filtering properties of the dielectric filter can be obtained. The present dielectric filter can be made compact and simple in construction.

The resonator electrodes, which may take the form of equi-spaced parallel elongate strips, may have short-circuited first ends which are connected to each other, by means of a ground conductor provided on an outer surface of the dielectric substrate, for example, on one of opposite side surfaces of the substrate. The resonator electrodes may have second ends which are exposed on another outer surface of the substrate, for example, on the other of the opposite side surfaces. In this case, the frequency characteristic of the filter may be readily adjusted with high precision by trimming the second end of the resonator electrode exposed at the outer surface of the substrate, whereby the dielectric filter can be fabricated with improved efficiency. Thus, the second object of the invention may be suitably achieved.

In the tri-plate type dielectric filter wherein the first ends of the resonator electrodes are short-circuited by the ground conductor, the resonator electrodes may be advantageously adapted to provide stripline type $\lambda/4$ or $\lambda/2$ TEM mode resonance circuits. In this case, the second ends of the resonator electrodes opposite to the short-circuited first ends are exposed at another outer surface of the dielectric substrate, so that the resonance frequency of the resonance circuits can be adjusted by trimming the exposed second ends of the resonator electrodes exposed.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
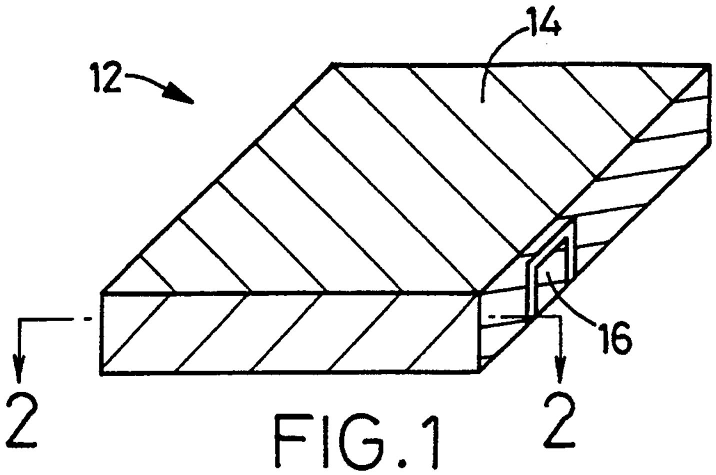
FIG. 1 is a perspective view showing one embodiment of a dielectric filter of the present invention.
Figure 2:
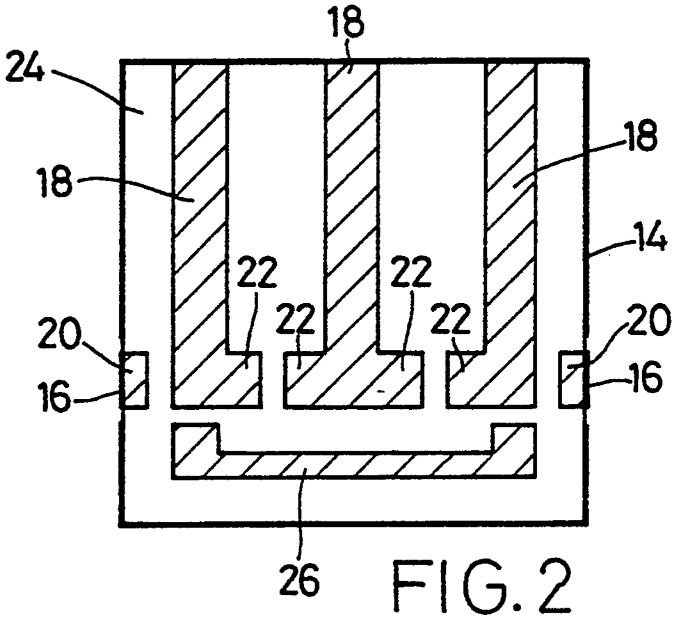
FIG. 2 is a cross sectional view taken along line 2—2 of FIG. 1.

Referring first to FIGS. 1 and 2, there is shown one example of a three-layered or tri-plate type dielectric filter constructed according to the principle of the present invention. The dielectric filter, as indicated generally at 12 in FIG. 1, is a generally rectangular structure whose six surfaces include two opposite major surfaces and four side surfaces. All of these six surfaces are coated with a ground conductor 14, namely, with respective six conductive films. However, small areas on the opposite two longer side surfaces are left uncovered with the conductive film, so that respective two input and output contacts 16, 16 are formed on those areas, as shown in FIGS. 1 and 2, such that the contacts 16 are electrically insulated from the ground conductor 14 (conductive films). Within the mass of the dielectric filter 2, there are embedded a plurality of resonator electrodes 18, an input and an output electrode 20, and a plurality of coupling electrodes 22, 26, as described below.

The dielectric filter 12 is a laminar structure fabricated by a common laminating method. The laminar structure includes a dielectric substrate 24 as shown in FIG. 2. On one major surface of this dielectric substrate 24, there is formed a patterned array of three parallel equi-spaced elongate strips 18 as the resonator electrodes. Further, the input and an output electrode 20 are formed on the same surface, such that these input and output electrodes 20 are electrically connected to the input and output contacts 16. These two electrodes 20 are positioned on the opposite sides of the array of the elongate strips 18. The three elongate strips 18 are formed in a comb-shaped pattern, so as to provide the respective resonators. The strips 18 have short-circuited first ends which are electrically connected to each other by means of ground conductor 14 having a conductive film formed on one of the opposite shorter side surfaces of the dielectric substrate 24. The other or second ends of the elongate strips 18 are located at a suitable distance inward of the other shorter side surface of the substrate 24. It will be understood that the parallel elongate strips 18 extend along the longer side surfaces of the substrate 24, and are spaced apart from each other in the direction parallel to the shorter side surfaces of the substrate 24.

The coupling electrodes 22 are formed integrally with the second ends of the elongate strips 18, such that each electrode 22 extends toward an adjacent second end of the adjacent strips 18. As shown in FIG. 2, the coupling electrodes 22 formed with the strips 18 are spaced apart from each other in the direction perpendicular to the direction of extension of the strips 18, for capacitively connecting the elongate strips 18 at their second ends. The thus patterned array of the coupling electrodes 22 provides capacitors between the second ends of the adjacent strips 18. The capacitance values of these capacitors can be adjusted by suitably patterning the array of the electrodes 22, whereby the desired filtering property of the filter 12 can be obtained. This adjustment is not possible on the known dielectric filter.

Between the patterned array of the coupling electrodes 22 and the shorter side surface of the substrate 24 opposite to the shorter side surface at which the first ends of the elongate strips 18 are connected to each other by the ground conductor 14, there is formed a generally U-shaped coupling electrode 26 for capacitively connecting the two outer elongate strips 18 at their second ends. Namely, two capacitors are provided, one between one end of the coupling electrode 26 and one of the two outer strips 18, and the other between the other end of the electrode 26 and the other outer strip 18. The capacitance values of these capacitors can also be adjusted by suitably patterning the coupling electrode 26, whereby the frequency characteristic of the dielectric filter can be improved.

The provision of the coupling electrodes 22, 26 makes it possible to meet stringent requirements for improved characteristic of the filter 12, while maintaining the filter 12 sufficiently thin and small-sized, with the electrodes 22, 26 as well as the elongate strips (resonator electrodes) 18 being embedded in the mass of the dielectric filter 12. Thus, the improved dielectric filter 12 can be obtained without increasing the size or the number of process steps. It is to be noted that the coupling electrode 26 for capacitively connecting the two outer elongate strips 18 is not essential according to the principle of this invention.

Figure 3:
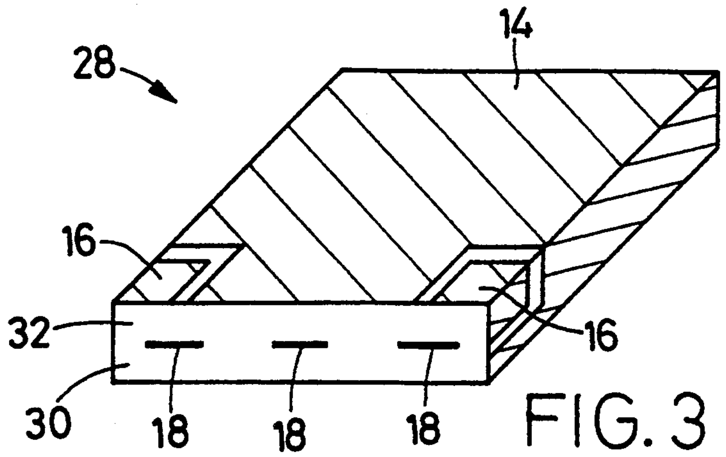
FIG. 3 is a perspective view showing another embodiment of the dielectric filter of the invention.

Referring next to FIGS. 3–7, there will be described another example of the tri-plate type dielectric filter, which is indicated generally at 28 in FIG. 3. The dielectric filter 28 is coated with the ground conductor 14, except for one of the opposite shorter side surfaces, at which the second ends of the elongate strips 18 (resonator electrodes) are exposed, as shown in FIG. 3. As in the first embodiment of FIGS. 1 and 2, the first ends of the strips 18 are short-circuited, i.e., electrically connected to each other by the conductive film 14 on the other of the opposite short side surfaces of the filter 28. Unlike the input and output contacts 16 in the first embodiment, the contacts 16 in the present embodiment are formed on corner portions provided by the top surface and the opposite long side surfaces of the filter 28, which are adjacent to the opposite ends of the short side surface at which the second ends of the strips 18 are exposed. These input and output contacts 16 are electrically insulated from the conductive films 14 on the top and long side surfaces of the filter 28. Namely, the corner portions indicated above are left uncovered by the conductive films 14.

Figure 4:
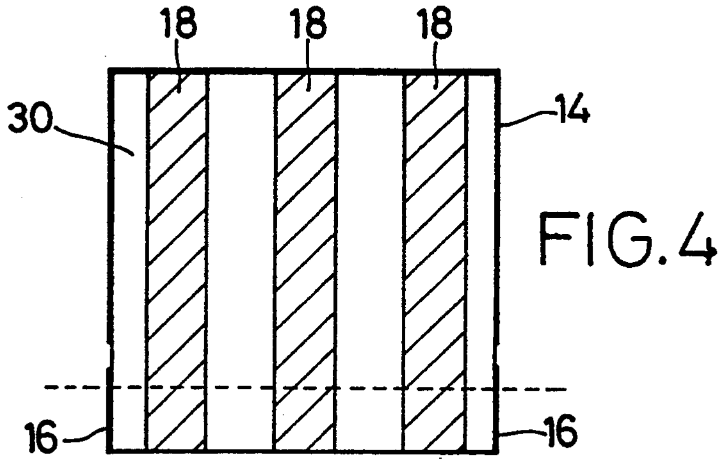
FIG. 4 is a plan view of a first dielectric plate of the dielectric filter of FIG. 3.
Figure 5:
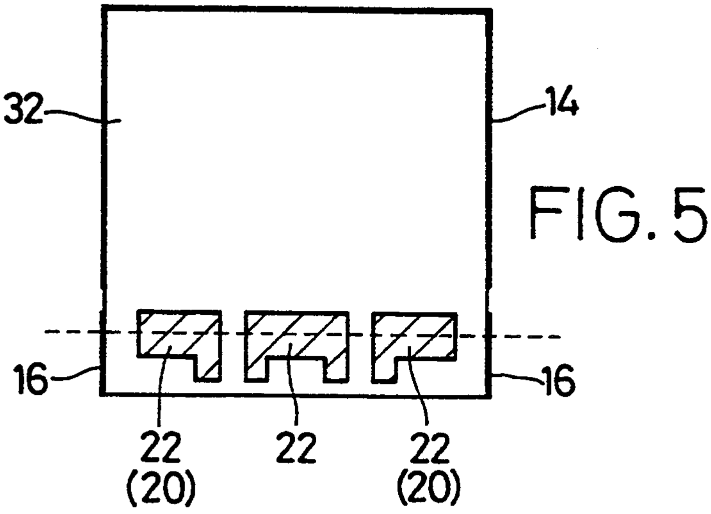
FIG. 5 is a plan view of a second dielectric plate of the dielectric filter of FIG. 3.

The dielectric filter 28 uses two dielectric substrates 30 and 32 as shown in FIGS. 4 and 5, respectively. The patterned array of equi-spaced parallel elongate strips 18 is formed on the first dielectric substrate 30, while the three coupling electrodes 22 for capacitively connecting the adjacent elongate strips 18 are formed on the second dielectric substrate 32. The first ends of the strips 18 are short-circuited on one of the opposite shorter side surfaces of the first substrate 30, while the second ends of the strips 18 are exposed at one of the opposite shorter side surfaces of the second substrate 32, which is opposite to the above-indicated one shorter side surface of the first substrate 30. The three coupling electrodes 22 are patterned such that these electrodes 22 are positioned right above and spaced apart from the second ends of the corresponding strips 18 when the first and second substrates 30, 32 are superposed on each other. A green laminar structure consisting of the superposed first and second substrates 30, 32 is fired into a blank for the dielectric filter 28.

Figure 6:
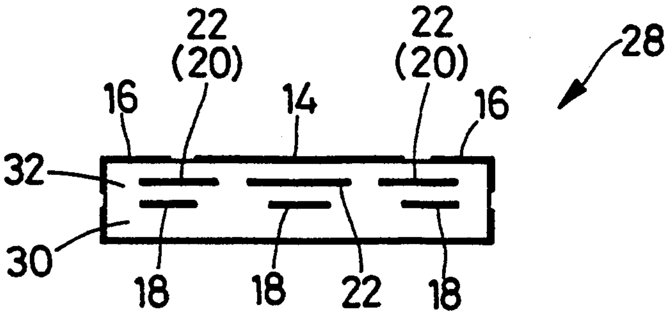
FIG. 6 is a cross sectional view taken in a cutting plane indicated in dashed line in FIGS. 4 and 5.

The thus prepared blank for the dielectric filter 8 is trimmed at a suitable position as indicated in dashed lines in FIGS. 4 and 5, which indicate a trimming plane which corresponds to the shorter side surface of the filter 12 on which the second ends of the strips 18 and the corresponding coupling electrodes 22 are exposed, as shown in FIG. 6.

Figure 7:
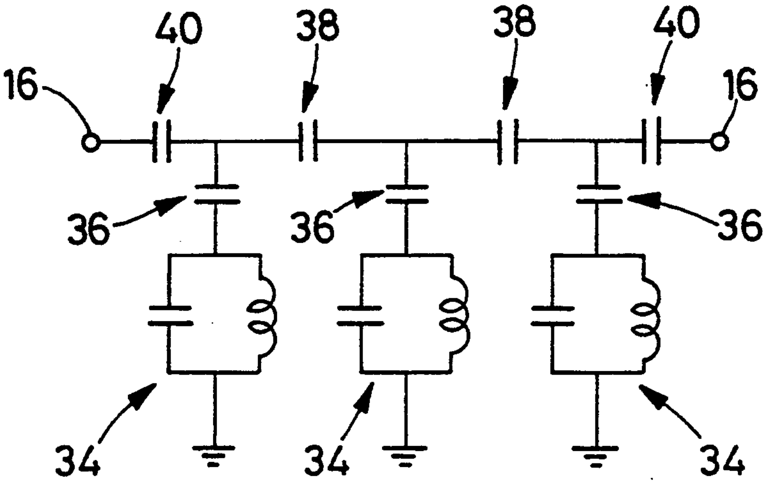
FIG. 7 is a view showing an equivalent circuit of the dielectric filter of FIG. 3.

Reference is now made to FIG. 7 showing an equivalent circuit of the dielectric filter 28. The equivalent circuit includes three resonators 34 corresponding to the three elongate strips 18, three capacitors 36 provided between the strips 18 and the coupling electrodes 22, and two capacitors 38 provided between the adjacent electrodes 22. The capacitance values of these capacitors 36, 38 can be adjusted as desired by suitably patterning the coupling electrodes 22, whereby the desired filtering property can be obtained, without increasing the size and complexity of the filter 28, with the coupling electrodes 22 embedded within the first and second dielectric substrates 30, 32.

In the present second embodiment, the coupling electrodes 22 are provided on the second dielectric substrate 32 and are spaced apart from the second ends of the elongate strips or resonator electrodes 18. Accordingly, the coupling electrodes 22 have a higher degree of freedom of patterning, without a design limitation by the second ends of the strips 18 as existing in the first embodiment. Thus, the present arrangement permits a relatively complicated circuit for capacitive connection of the second ends of the elongate strips 18 by the coupling electrodes 22.

In the second embodiment, the two outer coupling electrodes 22 serve also as the input and output electrodes (20), which are exclusively provided in the first embodiment. As shown in FIG. 7, these two outer coupling electrodes 22 provide respective capacitors 40 associated with the input and output contacts 16. The capacitance values of these input and output capacitors 40 can also be adjusted by suitably patterning the two outer coupling electrodes 22.

As described above, the dielectric filter 28 is trimmed at the second ends of the elongate strips 18 and the corresponding coupling electrodes 22, for fine adjustment of the frequency characteristic of the filter. The trimming operation for this adjustment is simple and easy, contributing to improved efficiency of fabrication of the filter 28.

Figure 8:
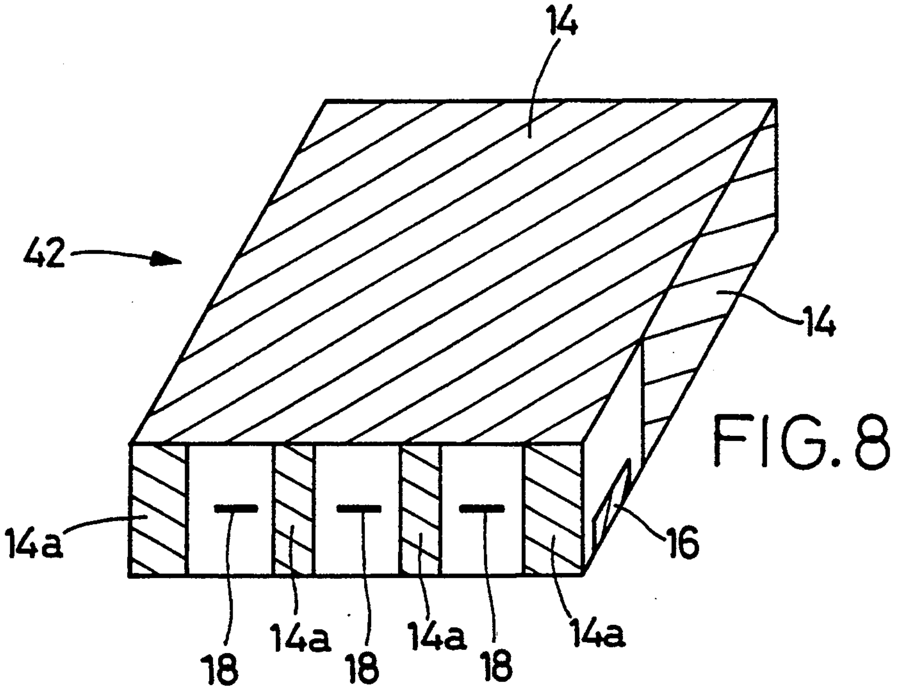
FIG. 8 is a perspective view showing a further embodiment of the dielectric filter of this invention.

Referring further to FIGS. 8–11, there will be described a further example of the tri-plate type dielectric filter, which is indicated generally at 42 in FIG. 8. The dielectric filter 42 is coated with the ground conductor 14, except for some areas of one of the opposite short side surfaces, at which the second ends of the respective elongate strips 18 are exposed, as shown in FIG. 8. That is, parallel spaced-apart elongate conductive strips **14*a* are formed on the above-indicated one short side surface of the dielectric filter 42, such that these conductive strips 14*a* define areas on which the respective elongate strips 18** of the resonator electrodes are exposed.

As in the first and second embodiments of FIGS. 1–7, the first ends of the strips 18 are short-circuited by the ground conductor 14 on the other of the opposite short side surfaces of the filter 42. As in the first embodiment of FIG. 1–2, the contacts 16 in this embodiment are formed on the opposite long side surfaces of the filter 42, and are electrically insulated from the ground conductor 14 on the long side surfaces of the filter 42.

Figure 9:
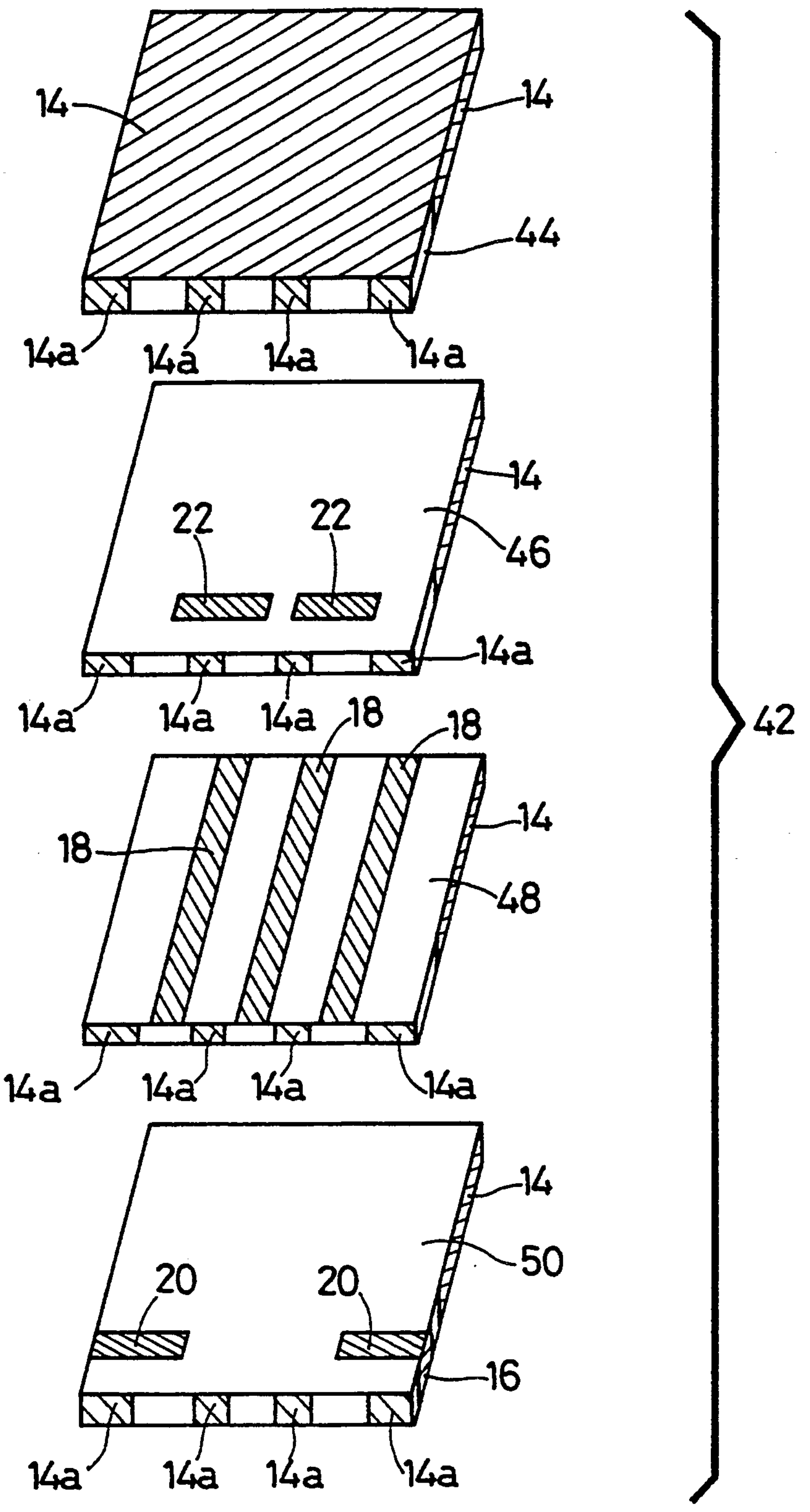
FIG. 9 is an exploded perspective view of the dielectric filter of FIG. 8.

More specifically, four substrates 44, 46, 48, 50 as shown in FIG. 8 are superposed on each other so as to form the dielectric filter 42 in which are embedded the coupling electrodes 22, elongate strips 18 and input and output electrodes 20. As shown in FIG. 9, the elongate strips 18 are formed on the third dielectric substrate 48 whose first ends are short-circuited by the conductive film 14 and whose seconds ends are exposed between the adjacent conductive strips **14*a* on one of the opposite long side surfaces of the filter 42, as described above. Further, the two coupling electrodes 22 for capacitively connecting the elongate strips 18 are formed on the second dielectric substrate 46 such that the coupling electrodes 22 are positioned right above and spaced apart from the second ends of the elongate strips 18. A green laminar structure consisting of the superposed four substrates 44, 46, 48, 50 is fired into a blank for the dielectric filter 42**.

Figure 10:
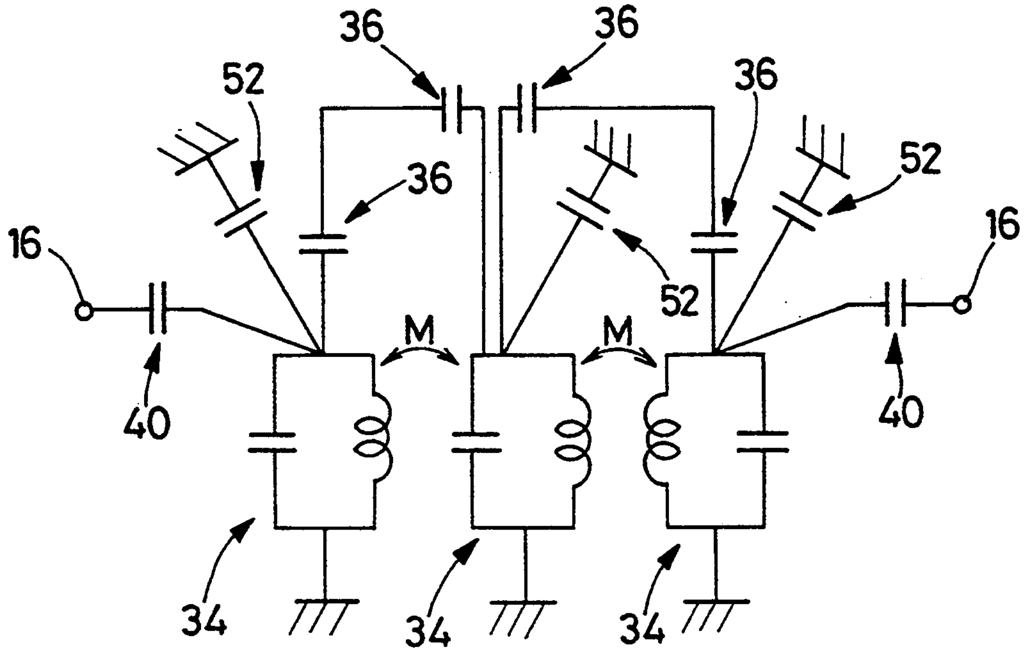
FIG. 10 is a view showing an equivalent circuit of the dielectric filter of FIG. 8.

There is illustrated in FIG. 10 an equivalent circuit of the dielectric filter 42, which includes three resonators 34 corresponding to the three elongate strips 18, and four capacitors 36 provided between the strips 18 and the coupling electrodes 22. The adjacent resonators 34 are electrically connected to each other through the capacitors 36 and the coupling electrodes 22. The capacitance values of the capacitors 36 can be adjusted as desired by suitably patterning the coupling electrodes 22 so as to obtain the desired filtering property.

Further, the elongate conductive strips **14*a* of the ground conductor 14 effectively eliminate a difference in potential between the conductive films on the opposite top and bottom surfaces of the dielectric filter 42, thereby assuring improved stability of the filtering characteristics of the filter 42**.

Figure 11:
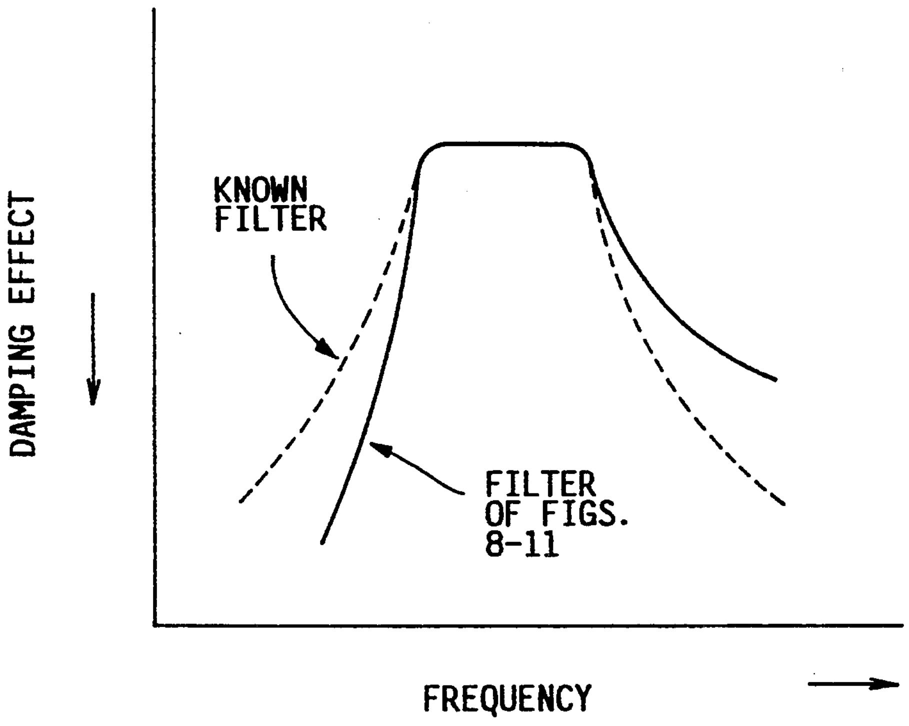
FIG. 11 is a graph indicating a relationship between the frequency and the damping effect of the filter of FIGS. 8–10.
Figure 12:
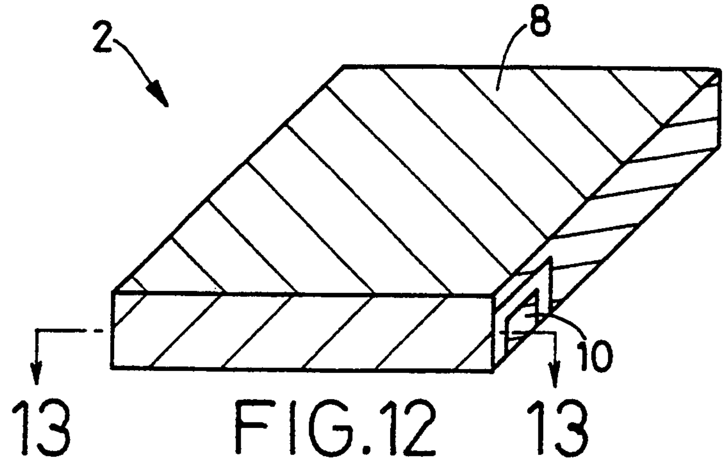
FIG.12 PRIOR ART
FIG. 12 is a perspective view showing a known dielectric filter.
Figure 13:
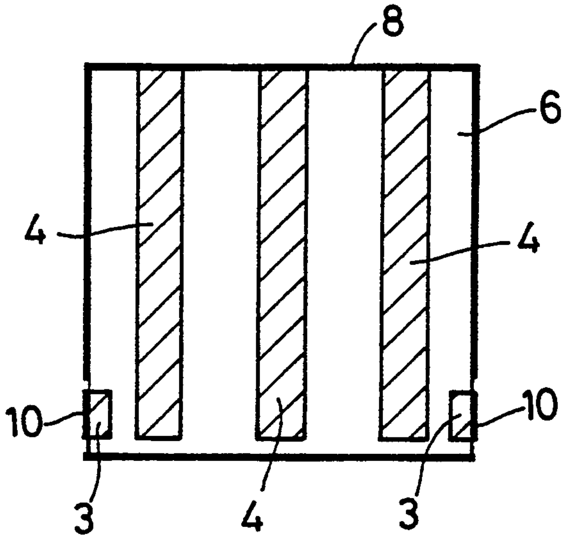
FIG.13 PRIOR ART
FIG. 13 is a cross sectional view taken along line 13—13 of FIG. 12.

The equivalent circuit also includes three capacitors 52 between the exposed or second end portions of the elongate strips 18 and the elongate conductive strips **14*a* on the corresponding short side surface of the dielectric filter 42, as indicated in FIG. 10. In the presence of these capacitors 52, the elongate strips 18 serving as the resonator electrodes are made inductive with respect to the resonance frequency, whereby there are provided an inductor M between the adjacent resonators 34. Thus, each resonator 34 is provided with a capacitor 36 and an inductor M, and the effect of damping by the instant dielectric filter on the input microwave spectrum is smaller in a frequency band of the spectrum lower than the pass band, than the effect of damping by the known dielectric filter, as indicated in the graph of FIG. 11. This means improved capability of filtering the desired frequency band. In addition, the provision of the capacitors 52 makes it possible to reduce the length of the resonators 34, for the same resonance frequency, thereby contributing to reduction in the size of the dielectric filter 42**.

According to the present invention, the resonator electrodes 18 in the form of the elongate strips and the coupling electrodes 22 which are entirely embedded within the dielectric substrate (24) or substrates (30, 32; 44, 46, 48, 50) are preferably formed of an electrically conductive material whose resistivity is relatively small, whose major component or components is/are Au, Ag and/or Cu, for example. Since the loss at the electrodes 18, 22 increases the loss of the filter in the pass band, it is desired that the resistivity of the connecting circuit be sufficiently low, particularly where the filter deals with the electromagnetic wavelengths in the microwave spectrum.

Where a Ag- or Cu-based electrically conductive material is used for the electrodes 18, 22, it is necessary to use a dielectric material (for the dielectric substrate or substrates 234, 30, 32) which can be fired or sintered at a temperature lower than the melting point (1100° C. or lower) of such electrically conductive material, since the melting point of the Ag- or Cu-based conductive material is too low to permit co-firing of the conductive material with an ordinary dielectric material. Where the dielectric filter is used as a microwave filter, it is desirable that the dielectric material is selected to assure that the temperature coefficient of the resonance frequency of resonance circuits corresponding to the resonator electrodes 18 be held not higher than ±50 ppm/° C. Examples of the preferred dielectric material include: a glass composition consisting of a mixture of a cordierite glass powder, a $TiO_2$ powder and a $Nd_2Ti_2O_7$ powder; and a mixture consisting of a $BaO-TiO_2-RE_2O_3-Bi_2O_3$ composition (Re: rare earth component) and a small amount of a glass forming component or a glass powder.

To further clarify the present invention, there will be described some examples of the present invention. However, it is to be understood that the invention is not limited to the details of the following examples, but may be embodied with various changes, modifications and improvements, which may occur to those skilled in the art, without departing from the spirit of the invention.

EXAMPLE 1

A powder mixture was prepared by sufficiently mixing 73 wt.% of a glass powder, 17 wt.% of a $TiO_2$ powder and 10 wt.% of an $Nd_2Ti_2O_7$ powder. The glass powder consists of 18 wt.% of MgO, 37 wt.% of $Al_2O_3$, 37 wt.% of $SiO_2$, 5 wt.% of $B_2O_3$ and 3 wt.% of $TiO_2$. The $Nd_2Ti_2O_7$ powder was obtained by mixing $Nd_2O_3$ powder and $TiO_2$ powder, calcining the mixture at 1200° C., and milling the calcined powder mass. To the prepared powder mixture, there were added an acrylic-based organic binder , a plasticizer, toluene and alcohol solvents. The powder mixture and these additives were well mixed by alumina balls, whereby a slurry was obtained. Using the slurry, green tapes having a thickness of 0.2–0.5 mm were formed by a doctor-blade method.

On the other hand, a Ag powder, an acrylic-based organic binder and a terpineol-based organic solvent were sufficiently kneaded by a three-roll method, whereby an electrically conductive printing paste was prepared. Using the printing paste, a pattern of electrically conductive material corresponding to the electrodes 18, 20, 22, 26 as shown in FIG. 2 was formed on some of the green tapes, while a conductive layer corresponding to the ground conductor 14 was formed on one surface of the other green tapes. One green tape having the pattern of electrodes and two green tapes each having the conductive layer were superposed on each other so that the pattern of electrodes are interposed by the two green tapes having the conductive layers, such that the two conductive layers form the opposite surfaces of the obtained laminar green tape. The laminar green tape was compacted at 100° C. under 100 $kg/cm^2$. The compacted laminar green tape was cut into pieces each corresponding to the dielectric filter 12 of FIG. 1. Then, the printing paste was applied to the four side surfaces of each piece, to form conductive pads corresponding to the input and output contacts, and conductive layers corresponding to the ground conductor 14 on the four side surfaces of the filter 12. Thus, a plurality of precursors for the dielectric filter 12 were prepared. These precursors were fired in the atmosphere, for 30 minutes at 900° C., whereby thin microwave filters having a total thickness of 2 mm were produced.

These filters had a band width of 20 MHz and an insertion loss of 3 dB, where the nominal frequency was 900 MHz. A sintered test piece was prepared by using the powder mixture described above. The test piece was ground to predetermined dimensions, and its temperature coefficient of the resonance frequency in the microwave spectrum was measured according to Hakki & Coleman method, over a temperature range from −25° C. to +75° C. The measured temperature coefficient was +10 ppm/° C.

EXAMPLE 2 <

A powder mixture was prepared by sufficiently mixing 73 wt.% of a glass powder, 17 wt.% of a $TiO_2$ powder and 10 wt.% of an $Nd_2Ti_2O_7$ powder. The glass powder consists of 17 wt.% of MgO, 37 wt.% of $Al_2O_3$, 37 wt.% of $SiO_2$, 5 wt.% of $B_2O_3$, 3 wt.% of $TiO_2$ and 1 wt.% of MnO. The $TiO_2$ powder was obtained by mixing commercially available $TiO_2$ and MnO powders, calcining the mixture at 1200° C., and milling the calcined powder mass. The $Nd_2Ti_2O_7$ powder was obtained by $Nd_2O_3$ powder, $TiO_2$ powder and MnO powder, calcining the mixture at 1200° C., and milling the calcined powder mass.

To the prepared powder mixture, there were added an acrylic-based organic binder , a plasticizer, toluene and alcohol solvents. The powder mixture and these additives were mixed by alumina balls, whereby a slurry was obtained. Using the slurry, green tapes having a thickness of 0.2–0.5 mm were formed by a doctor-blade method.

On the other hand, a Cu powder, an acrylic-based organic binder and a terpineol-based organic solvent were sufficiently kneaded by a three-roll method, whereby an electrically conductive printing paste was prepared. Using the printing paste, a pattern of electrodes and a conductive layer were printed on the green tapes, and compacted laminar green tapes for the filter 12 of FIG. 1 were prepared, as in Example 1. Then, precursors for the dielectric filter 12 were prepared by applying the printing paste to the laminar green tapes as in Example 1. The precursors were fired in a nitrogen atmosphere, for 30 minutes at 950° C., whereby thin microwave filters having a total thickness of 2 mm were produced. These filters had a band width of 30 MHz and an insertion loss of 3.5 dB, where the nominal frequency was 900 MHz.

EXAMPLE 3

A pattern of electrically conductive material corresponding to the resonator electrodes 18, 20, 22, 26 was printed on the green tapes as prepared in Example 1, by using a Ag paste, and compacted laminar green tapes for the filter 12 were prepared. Then, a commercially available Cu paste was applied to form conductive films and pads corresponding to the ground conductor 14 and input and output contacts 16, whereby precursors for the filter 12 of FIG. 1 were obtained. The precursors were fired in the atmosphere, for 30 minutes at 600° C., into 2-mm thick microwave filters. These filters had a band width of 20 MHz and an insertion loss of 3 dB, where the nominal frequency was 900 MHz.

EXAMPLE 4

A powder mixture was prepared by adding a total of 8 wt.% of a low-melting point glass powder and a low-melting point metal oxide powder, to 92 wt. % of a powdered $BaO-TiO_2-Nd_2O_3-Bi_2O_3$ composition. To the prepared powder mixture, there were added an acrylic-based organic binder, a plasticizer, toluene and alcohol solvents. The powder mixture and these additives were well mixed by alumina balls, whereby a slurry was obtained. Using the slurry, green tapes having a thickness of 0.2–0.5 mm were formed by a doctor-blade method.

On the other hand, a Ag powder, an acrylic-based organic binder and a terpineol-based organic solvent were sufficiently kneaded by a three-roll method, whereby an electrically conductive printing paste was prepared. Using the printing paste, a pattern of electrically conductive material corresponding to the resonator electrodes 18 as shown in FIG. 4 was formed on some of the green tapes, while a pattern of electrically conductive material corresponding to the coupling electrodes 22 were formed on the other green tapes. Further, a conductive layer corresponding to the ground conductor film 14 and conductive pads corresponding to the input and output contacts 16 as shown in FIG. 3 were formed on one surface of the yet other green tapes. The following four green tapes were superposed on each other in the order of description: one green tape having the conductive layer and the two conductive pads; two green tapes, one having the pattern for the resonant electrodes 18 and the other having the pattern for the coupling electrodes 22; and one green tape having the conductive layer. The prepared laminar green tape was compacted at 100° C. under 100 kg/cm$^2$. The compacted laminar green tape was cut into pieces each corresponding to the dielectric filter 28 of FIG. 3. Then, the printing paste was applied to the four side surfaces of each piece, to form conductive layers corresponding to the ground conductor 14 on the four side surfaces of the filter 28. Thus, a plurality of precursors for the dielectric filter 28 were prepared. These precursors were fired in the atmosphere, for 30 minutes at 900° C., whereby thin microwave filters having a total thickness of 2 mm were produced.

These filters 28 had a band width of 20 MHz and an insertion loss of 3 dB, where the nominal frequency was 900 MHz. A sintered test piece was prepared by using the powder mixture used for producing the filters 28. The test piece was ground to predetermined dimensions, and its temperature coefficient of the resonance frequency in the microwave spectrum was measured according to Hakki & Coleman method, over a temperature range from −25° C. to +75° C. The measured temperature coefficient was +15 ppm/° C. Before the measurement, a fine adjustment of the frequency characteristic of the test piece was made by trimming the second ends of the resonator electrodes 18 and the coupling electrodes 22.

EXAMPLE 5

A powder mixture was prepared by adding a total of 8 wt.% of a low-melting point glass powder and a low-melting point metal oxide powder, to 92 wt.% of a powdered $BaO-TiO_2-Nd_2O_3-Bi_2O_3$ composition. To the prepared powder mixture, there were added an acrylic-based organic binder , a plasticizer, toluene and alcohol solvents. The powder mixture and these additives were well mixed by alumina balls, whereby a slurry was obtained. Using the slurry, green tapes having a thickness of 0.2–0.5 mm were formed by a doctor-blade method.

On the other hand, a Ag powder, an acrylic-based organic binder and a terpineol-based organic solvent were sufficiently kneaded by a three-roll method, whereby an electrically conductive printing paste was prepared. Using the printing paste, patterns of electrically conductive material corresponding to the resonator electrodes 18, input and output electrodes 20 and coupling electrodes 22 as shown in FIG. 9 were formed on respective green tapes for the third, fourth and second dielectric substrates 48, 50 and 46. Further, conductive films corresponding to the top and bottom conductor films 14 were formed on the appropriate green tapes. The green tapes having the conductive patterns and films were superposed on each other in the appropriate order. The thus prepared laminar green tape was compacted at 100° C. under 100 kg/cm$^2$. The compacted laminar green tape was cut into pieces each corresponding to the dielectric filter 42 of FIG. 8. Then, the printing paste was applied to the four side surfaces of each piece, to form conductive layers corresponding to the ground conductor 14 and strips 14*a* on the four side surfaces of the filter 42. Thus, a plurality of precursors for the dielectric filter 42 were prepared. These precursors were fired in the atmosphere, for 30 minutes at 900° C., whereby thin microwave filters having a total thickness of 2 mm were produced.

These filters 42 had a band width of 20 MHz and an insertion loss of 3 dB, where the nominal frequency was 900 MHz. A sintered test piece was prepared by using the powder mixture used for producing the filters 42. The test piece was ground to predetermined dimensions, and its temperature coefficient of the resonance frequency in the microwave spectrum was measured according to Hakki & Coleman method, over a temperature range from −25° C. to +75° C. The measured temperature coefficient was +15 ppm/° C. Before the measurement, a fine adjustment of the frequency characteristic of the test piece was made by trimming the second ends of the resonator electrodes 18 and the coupling electrodes 22.

What is claimed is:

1. A tri-plate type dielectric filter, comprising:

a dielectric substrate;

a plurality of resonator electrodes embedded in said dielectric substrate; and coupling means for capacitively connecting said resonator electrodes to each other so as to provide capacitors between adjacent resonator electrodes, said coupling means comprising coupling electrodes formed within said dielectric substrate.

2. The tri-plate type dielectric filter of claim 1, further comprising a ground conductor provided on an outer surface of said dielectric substrate, each of said resonator electrodes being electrically connected to each other by said ground conductor.

3. The tri-plate type dielectric filter of claim 2, wherein said plurality of resonator electrodes consist of a plurality of elongate strips, respectively, each elongate strip having a first end and a second end, each first end being electrically connected to each other by said ground conductor, said plurality of elongate strips being substantially parallel to each other.

4. The tri-plate type dielectric filter of claim 3, wherein said coupling electrodes are formed integrally with said second ends of said resonator electrodes.

5. The tri-plate type dielectric filter of claim 4, wherein said coupling electrodes include a coupling electrode for capacitively connecting the two outermost resonator electrodes.

6. The tri-plate type dielectric filter of claim 2, wherein each of said resonator electrodes provides a stripline type λ/4 or λ/2 TEM mode resonance circuit, and each second end of the resonator electrodes is exposed at a second side surface of said dielectric substrate.

7. The tri-plate type dielectric filter of claim 6, wherein a corresponding coupling electrode is present for each resonator electrode, each second end of said resonator electrodes being spaced apart from each corresponding coupling electrode in a direction of thickness of said dielectric substrate.

8. The tri-plate type dielectric filter of claim 6, wherein said ground conductor is formed along said top, said bottom and said four side surfaces, and said second ends of said resonator electrodes are electrically insulated from said ground conductor.

9. A tri-plate type dielectric filter, comprising:

a dielectric substrate having top, bottom and four side surfaces;

a plurality of resonator electrodes embedded in said dielectric substrate, each of said resonator electrodes having a first end and a second end, said resonator electrodes being juxtaposed and having said first ends spaced along a first side surface of said dielectric substrate;

a ground conductor disposed on at least said first side surface and electrically connecting said first ends of said resonator electrodes to each other thereby short-circuiting said first ends of said resonator electrodes; and coupling means for capacitively connecting resonator electrodes to each other so as to provide capacitors between adjacent resonator electrodes, said coupling means comprising coupling electrodes formed within said dielectric substrate.

10. The tri-plate type dielectric filter of claim 9, wherein said coupling electrodes are formed integrally with said second ends of said resonator electrodes.

11. The tri-plate type dielectric filter of claim 10, wherein said coupling electrodes include a coupling electrode for capacitively connecting the two outermost resonator electrodes.

12. The tri-plate type dielectric filter of claim 1, wherein said coupling electrodes are formed separately from said ground conductor.

13. The tri-plate type dielectric filter of claim 9, wherein said coupling electrodes are formed separately from said ground conductor.

* * * * *